United States Patent [19]

Sakata

[11] Patent Number: 5,301,966

[45] Date of Patent: Apr. 12, 1994

[54] AIR BAG DEVICE FOR A PASSENGER

[75] Inventor: Yoshiaki Sakata, Shiga, Japan

[73] Assignee: Takata Corporation, Tokyo, Japan

[21] Appl. No.: 22,262

[22] Filed: Feb. 25, 1993

[30] Foreign Application Priority Data

Mar. 10, 1992 [JP] Japan .................. 4-051625

[51] Int. Cl.5 ............................... B60R 21/16
[52] U.S. Cl. .................... 280/728; 280/732
[58] Field of Search .......... 280/728 B, 728 R, 732, 280/728 A

[56] References Cited

U.S. PATENT DOCUMENTS

| | | | |
|---|---|---|---|
| 4,773,673 | 9/1988 | Sakurai | 280/732 |
| 4,878,689 | 11/1989 | Mitzkus et al. | 280/731 |
| 5,031,930 | 7/1991 | Sato | 280/728 B |
| 5,035,444 | 7/1991 | Carter | 280/732 |
| 5,066,037 | 11/1991 | Castrigno et al. | 280/732 |
| 5,135,255 | 8/1992 | Heuseler et al. | 280/728 B |

FOREIGN PATENT DOCUMENTS 0517414 12/1992 European Pat. Off. .
4128945 4/1992 Fed. Rep. of Germany ... 280/728 B Primary Examiner—Margaret A. Focarino
Assistant Examiner—Christopher P. Ellis
Attorney, Agent, or Firm—Kanesaka and Takeuchi

[57] ABSTRACT

An air bag device for a passenger is formed of a box-shaped container having its front face opened, an air bag fitted in a folded shape in the container, an inflater mounted in the container, a lid covering the open face of the container, and a hinge adapted to turn on a hinge pin and hinging one side of the lid to one side of the front edge of the container. The lid is opened on the hinge pin when the inflater operates.

6 Claims, 6 Drawing Sheets

AIR BAG DEVICE FOR A PASSENGER

FIELD OF THE INVENTION

The present invention relates to an air bag device for a passenger, which is mounted on a vehicle to protect a passenger by extending an air bag at the time of a collision of the vehicle.

DESCRIPTION OF THE RELATED ART

In the passenger's air bag device, a folded air bag and an inflater are mounted in a container, to which is attached a lid to cover the air bag. At the time of a vehicular collision, the inflater is energized to inflate the air bag. Then, the lid is opened into a cabin by the push of the air bag inflated so that the air bag is largely extended into the cabin to protect the passenger.

In FIGS. 3 to 5 showing an air bag device 10 existing in the prior art: FIG. 3 is a schematic perspective view showing the entire construction before the air bag is inflated; FIG. 4 is a side elevation; and FIG. 5 is an exploded perspective view.

A lid 14 is attached to the opened front face of a box-shaped container 12. An inflater 16 is fixed in the container 12. An air bag 18 is fitted in a folded shape in the container 12 and fixed by means of bolts 19.

The container 12 is formed in its upper and lower walls with a number of air vent holes 20. When the inflater 16 is energized to inject gases into the container 12 thereby to inflate the air bag 18, the ambient air flows through those air vent holes 20 into the container 12 to extend the air bag 18 quickly.

The lid 14 is equipped with a backup plate 22 made of an aluminum alloy and a soft cover 24 made of a resin such as foamed urethane and mounted on the front face of the plate 22. This plate 22 has its upper edge extended upward to form a lid mount 26.

To the upper face of the container 12, there is fixed a lid mounting bracket 28 by the spot welding or the like. This lid mounting bracket 28 extends along the upper face of the container 12 and is formed with a number of bolt holes 30. The lid mount 26 is also formed with a number of bolt holes 32. The lid mount 26 is fixed on the lid mounting bracket 28 by means of bolts 34 and nuts.

The container 12 has its back face curved to receive the inflater 16, as shown in FIG. 5. In this back face, there are opened slits 36 for introducing the injected gases of the inflater 16 into the container 12. The inflater 16 is held in the container 12 by an inflater cover 38. This inflater cover 38 is fixed on the container 12 by means of bolts 40. Numeral 42 designates openings for passing the bolts 40 therethrough.

As the inflater 16 is energized to inject the gases into the container 12 so that the air bag 18 begins to expand, the lid 14 is turned upward, as indicated by arrow 14B in FIG. 4.

When the air bag 18 is extended, the upper edge 140 of the lid 14 comes into abutment against the upper edge of an air bag device mounting window 152 of the instrument panel 150 of a vehicle. As a result, the motion of the lid 14 in the opening direction is blocked by the upper edge of the window 152 so that the opening rate of the lid 14 is restricted.

OBJECT AND SUMMARY OF THE INVENTION

An object of the present invention is to provide an air bad device for a passenger, which is enabled to open the lid remarkably quickly by solving the above-specified problems of the prior art.

According to a first aspect of the present invention, there is provided an air bag device for a passenger, comprising a box-shaped container having its front face opened, an air bag fitted in a folded shape in the container, an inflater mounted in the container, a lid covering the open face of the container, and hinges adapted to turn on hinge pins and hinging one side of the lid to one side of the front edge of the container. The lid is opened on the hinge pins when the inflater operates.

In the air bag device according to a second aspect of the present invention, the one side of the lid is protruded from one side of the front edge of the container to provide a lid brim which has a fragile portion in the vicinity of the hinges and which is arranged at its back side with an edge portion of an air bag device mounting window of the instrument panel of a vehicle. The lid is bent along the fragile portion when it is opened.

According to the air bag device for a passenger of the present invention, the lid is opened forward by the push of the air bag when the inflater is energized to inflate the air bag. This lid is turned remarkably easily because it is hinged.

In the passenger's air bag device according to the second aspect, the lid brim is turned backward as the lid begins to open. And, the lid brim is deformed in its vicinity near the hinges by the push of the edge portion leading from the instrument panel. Since the lid brim is easily deformed, it will not raise any obstruction against the opening motion of the lid so that the lid can be quickly turned.

DESCRIPTION OF THE PREFERRED EMBODIMENTS

Figure 1:
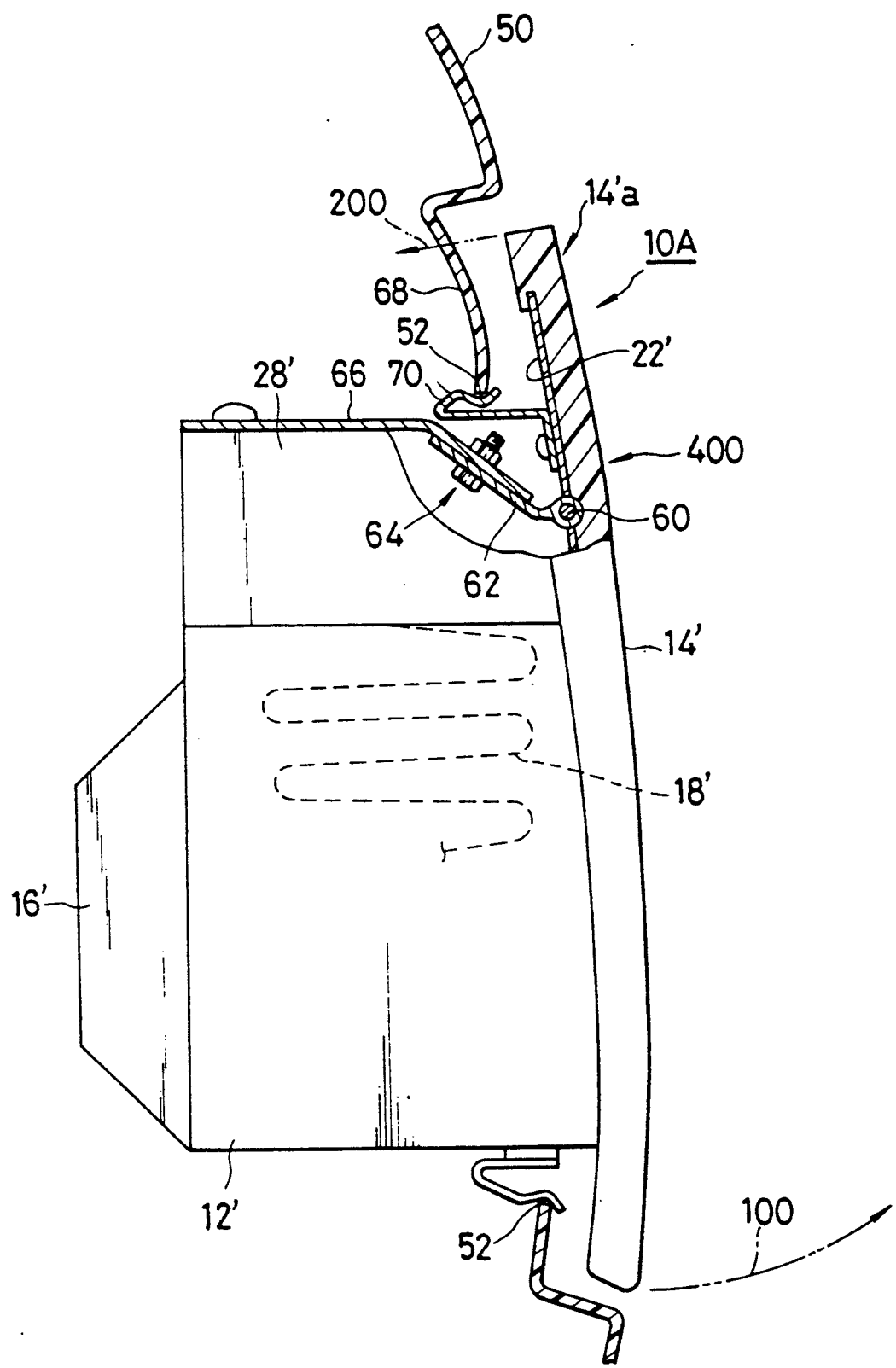
FIG. 1 is a section showing an air bag device for a passenger according to one embodiment of the present invention and taken along line I—I of FIG. 2.

An embodiment of an air bag device 10A according to an embodiment will be described in the following with reference to FIGS. 1 and 2.

A backup plate 22' at the back face of a lid 14' is equipped with hinges 64 each having a hinge pin 60 and a hinge plate 62. On the upper face of a lid mounting bracket 28', there are fixed tongues 66 which are extended forward. The hinge plates 62 are fixed on the tongues 66 by means of bolts.

The lid 14' has its upper edge extended upward from the lid mounting bracket 28' to provide a lid brim 14'a, which is backed up by the edge 68 of a window 52 of the instrument panel 50 for mounting the air bag device 10A. And, the brim 14'a is made fragile in its portion 400 near the hinges. In order to make the hinge-near portion 400 fragile, the backup plate 22' is perforated, as indicated at 410. A lit may be formed in place of or together with the perforations. A spring member 70 fixed on the backup plate 22' is held in abutment against the edge 68.

Figure 2:
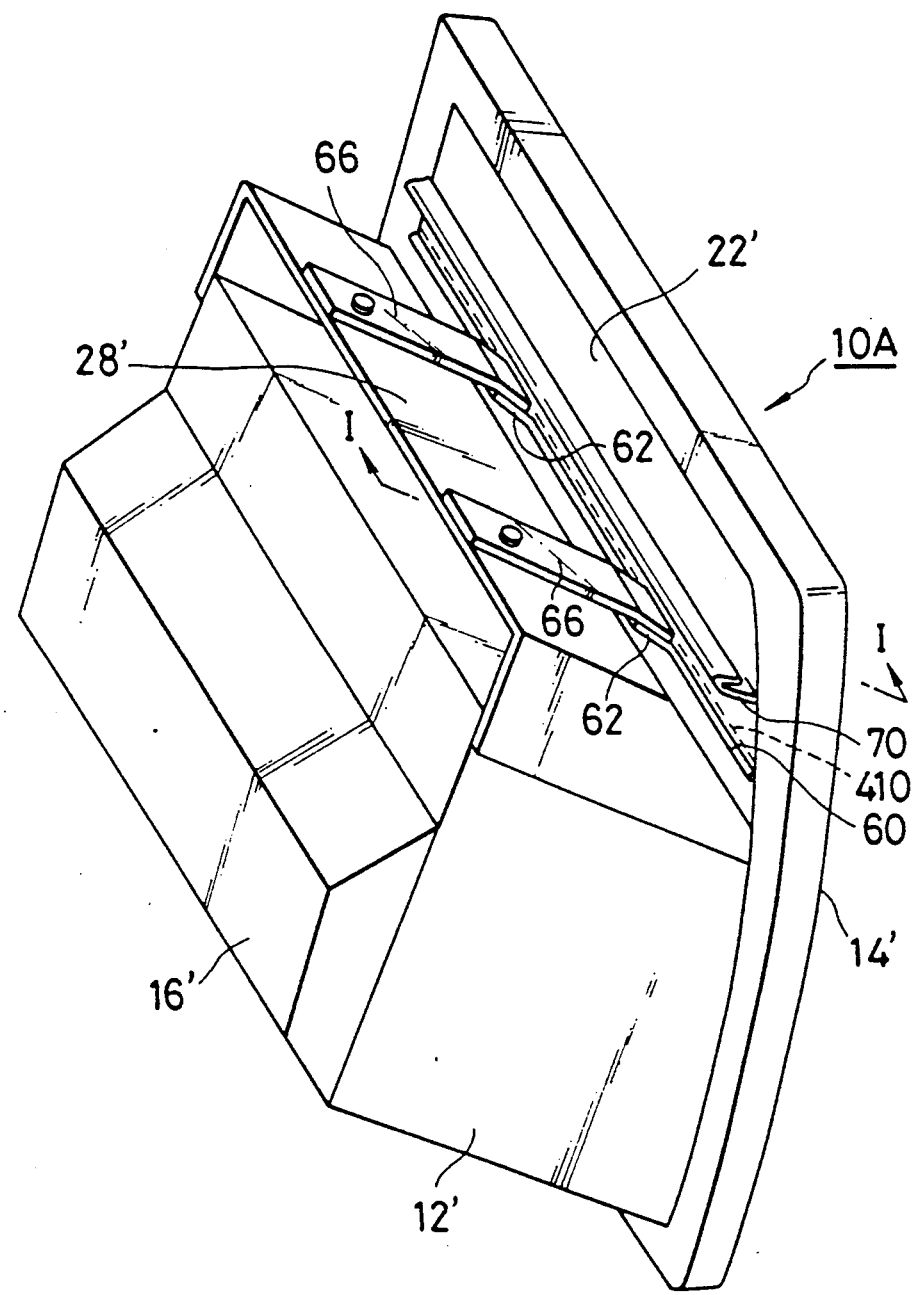
FIG. 2 is a perspective view showing the passenger's air bag device according to the embodiment.
Figure 3:
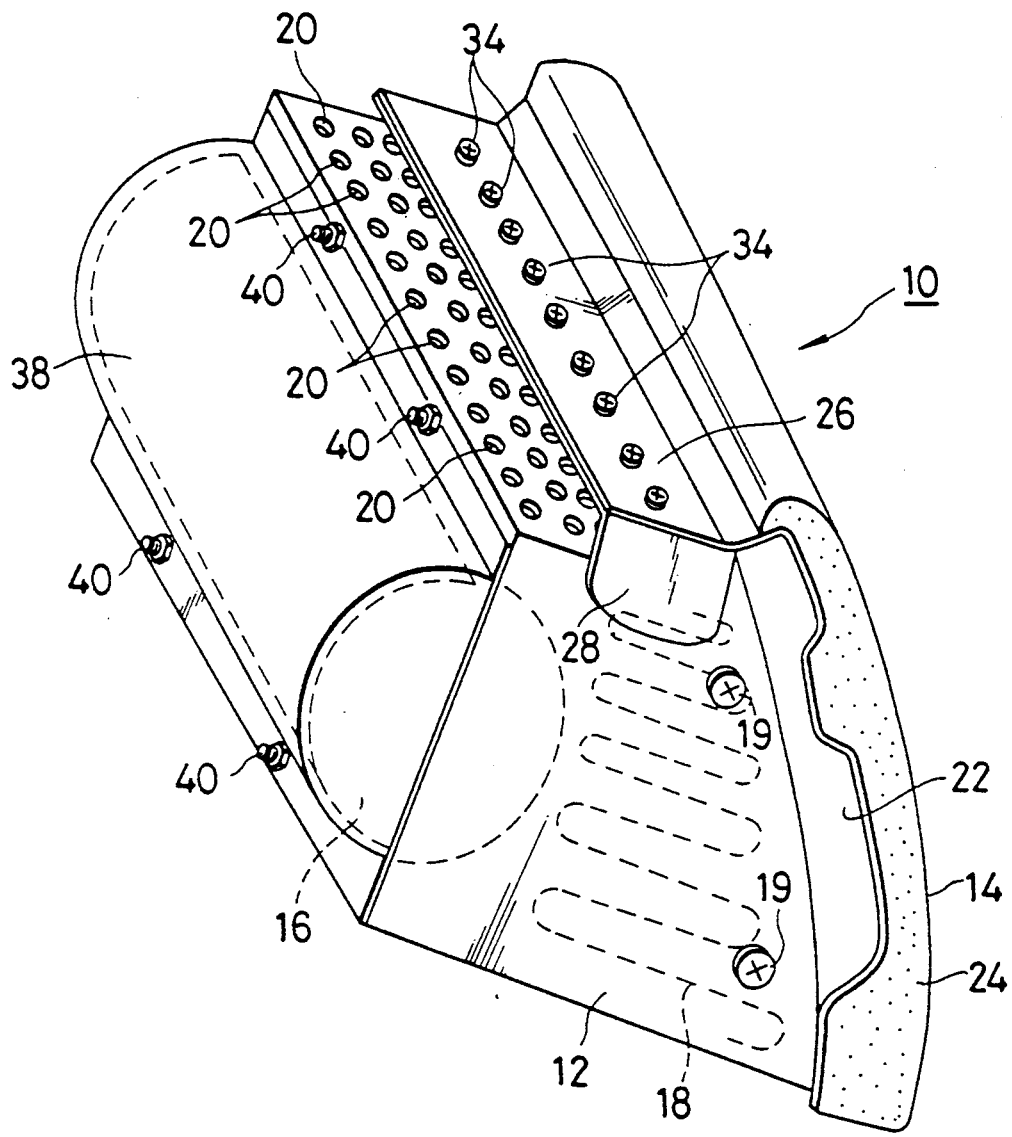
FIG. 3 is a perspective view showing the passenger's air bad device of the prior art.
Figure 4:
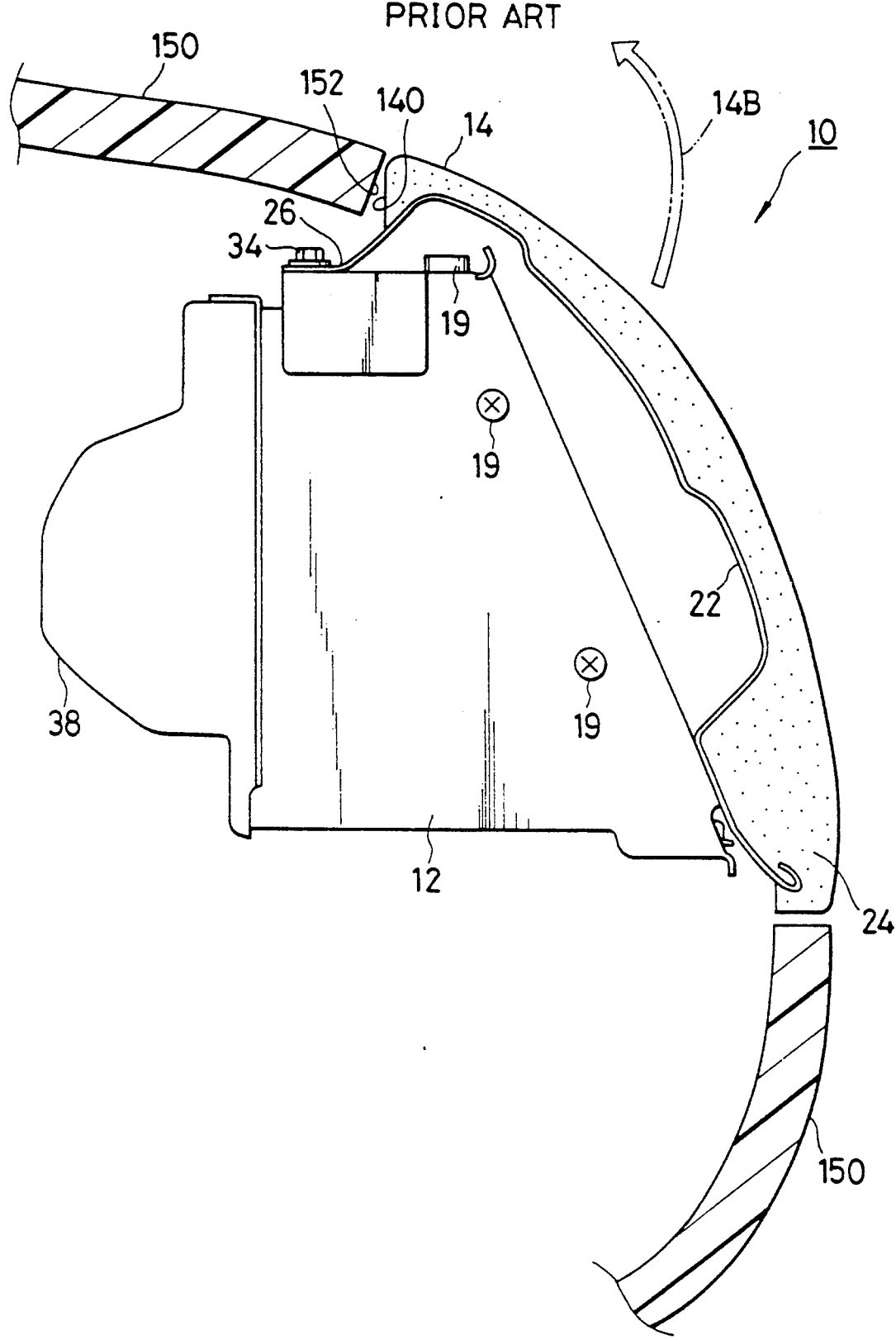
FIG. 4 is a side elevation showing the passenger's air bag device of the prior art.
Figure 5:
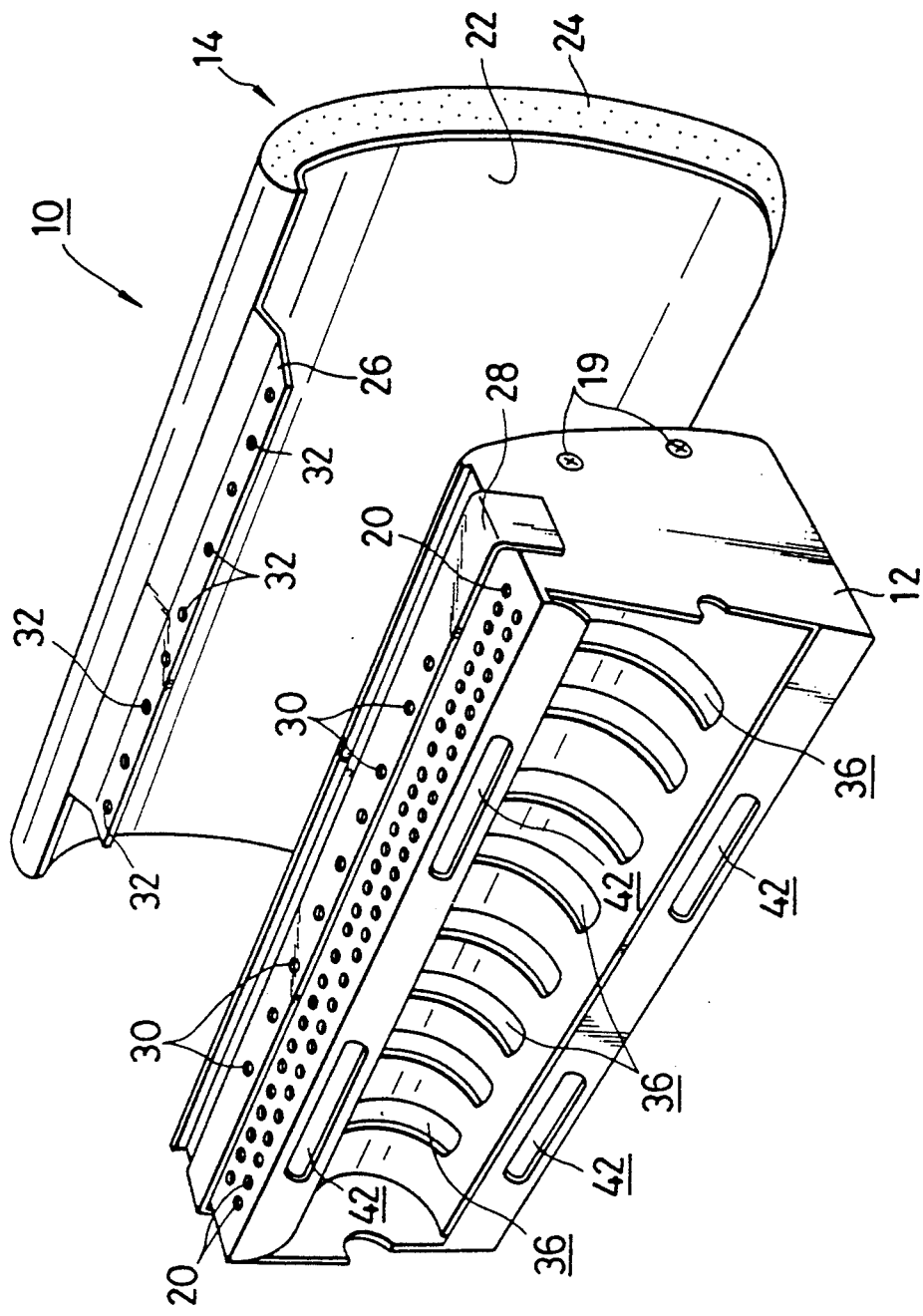
FIG. 5 is an exploded perspective view showing the passenger's air bag device of the prior art.

The remaining portions of the construction of FIGS. 1 and 2 are similar to those of the example of the prior art. Reference numeral 12' designates a container; numeral 16' designates an inflater; and numeral 18' designates an air bag.

In the passenger's air bag device 10A thus constructed, when the inflater 16' is energized to inflate the air bag 18', the lid 14' begins to be opened forward, as indicated by arrow 100, by the push of the air bag 18'. Since the lid 14' is supported by the hinges 64, it can turn remarkably easily on the hinge pins 60.

As the lid 14' opens, its brim 14'a turns back, as indicated by arrow 200. Then, the lid brim 14'a is deformed from the hinge-near portion by the push of the edge 68 of the instrument panel 50. Since the lid brim 14'a is easily deformable, it will not obstruct the extension of the lid so that the lid can turn quickly. The spring members 70 are also easily deformable so that they will not obstruct the extension of the lid.

Figure 6:
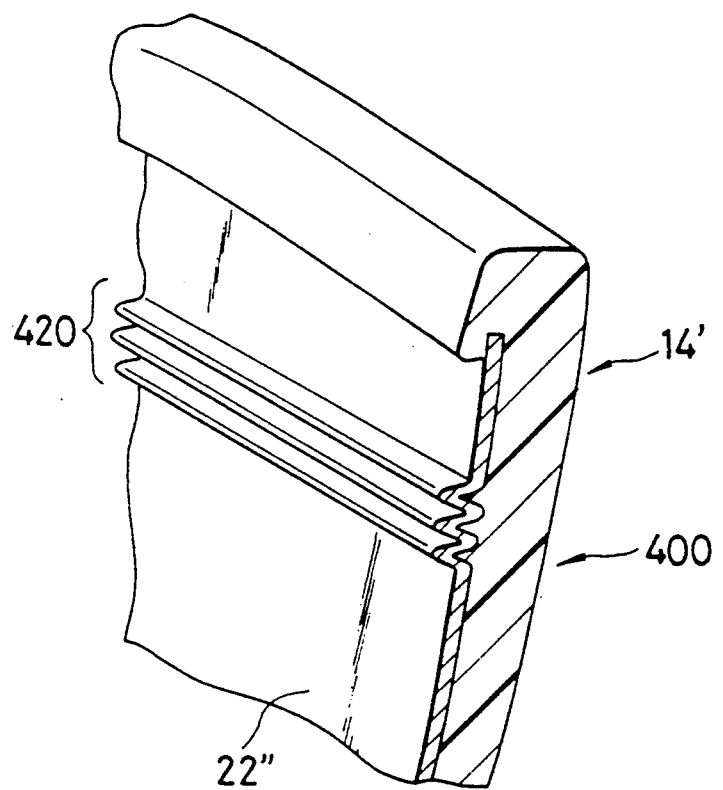
FIG. 6 is a perspective view showing a section of a lid according to another embodiment.

The hinge-near portion 400 can be made fragile not only by the perforations 410 but also by forming corrugations 420 on a backup plate 22'', as shown in FIG. 6.

According to the passenger's air bag device of the present invention, as has been described herein-before, the lid can turn remarkably easily when it is begun to open forward by the operation of the inflater. As a result, the air bag can be extended remarkably quickly into the cabin and over a wide range in the cabin.

What is claimed is:

1. An air bag device for a passenger adapted to be installed in an air bag device mounting window of an instrument panel of a vehicle, comprising:
   a box-shaped container having an open front face and a front edge at one side thereof;
   an air bag fitted in a folded shape in said container;
   an inflater mounted in said container;
   a lid for covering the open front face of said container and having at one side a lid brim protruded from the front edge of the container, said lid brim having a fragile portion and being arranged at a back side thereof with an edge portion of the air bag device mounting window; and
   a hinge having a hinge pin and turning around the hinge pin, said hinge hinging one side of said lid in a vicinity of said fragile portion to the one side of the front edge of said container so that said lid is opened on said hinge pin and is bent along the fragile portion when said inflater operates.

2. An air bag device according to claim 1, wherein said hinge is positioned along an upper side of said lid so that a lower side of said lid is turned upward when said inflater is energized.

3. An air bag device according to claim 1, wherein said lid has a soft cover and a backup plate, on which are attached said hinge.

4. An air bag device according to claim 3, wherein said backup plate is formed with a fragile portion in the vicinity of said hinge.

5. An air bag device according to claim 4, wherein said fragile portion is at least one of perforations and a slit.

6. An air bag device according to claim 4, wherein said fragile portion is corrugations.

* * * * *